Feb. 25, 1930.  G. F. COLLEY ET AL  1,748,866
ANTISHIMMY DEVICE
Filed Feb. 8, 1929
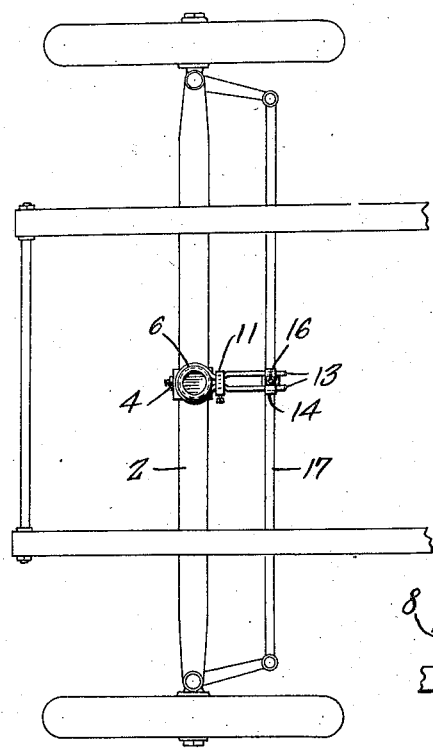
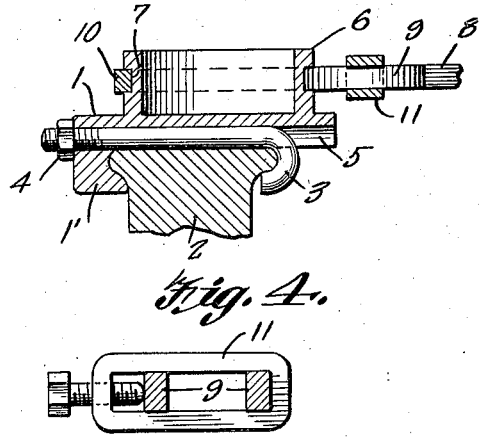
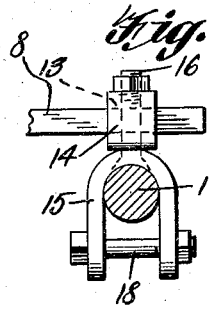
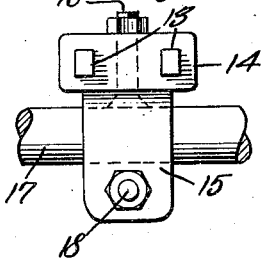
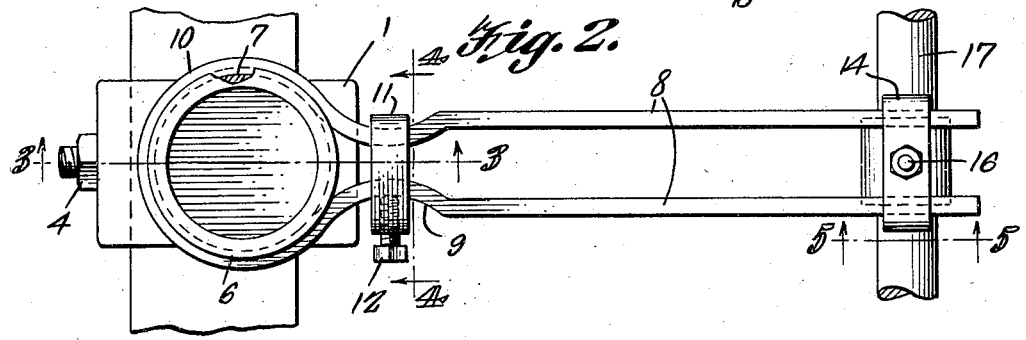
George F. Colley,
Thomas W. Teddy,
INVENTORS
BY Victor J. Evans
ATTORNEY Patented Feb. 25, 1930

1,748,866

UNITED STATES PATENT OFFICE

GEORGE F. COLLEY AND THOMAS W. TEDDY, OF LOS ANGELES, CALIFORNIA; SAID COLLEY ASSIGNOR TO SAID TEDDY

ANTISHIMMY DEVICE

Application filed February 8, 1929. Serial No. 338,601.

This invention relates to an anti-shimmy brace for motor vehicles, the general object of the invention being to provide means for rotatably connecting the front end of the brace to the front axle and to slidably connect the rear end of the brace to the connecting rod of the steering mechanism whereby the steering mechanism will be supported by the brace, while permitted to move in the ordinary manner.

Another object of the invention is to provide means for adjusting the frictional engagement of the brace with the member on which it is rotatably supported.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a plan view of the front part of the chassis of a motor vehicle, showing the invention in use.

Figure 2 is an enlarged plan view, showing how the brace is connected with its support on the front axle and with the connecting rod.

Figure 3 is a section on line 3—3 of Figure 2.

Figure 4 is a section on line 4—4 of Figure 2.

Figure 5 is a section on line 5—5 of Figure 2.

Figure 6 is an end view of the brace and the means for connecting it with the connecting rod.

In these views, the numeral 1 indicates a bracket which is adapted to be connected with the front axle 2 of a vehicle. The drawing shows this bracket provided with a stationary jaw 1' for engaging the front part of the axle and with the movable jaw or jaws 3 for engaging a rear part of the axle, this jaw 3, or each jaw, if more than one jaw is used, is formed with a rod having one end bent into hook shape with its other end threaded and passing through a hole formed in the front of the bracket where the threaded part receives a nut 4 so that the jaw can be moved into clamping or unclamping position. The under face of the bracket is grooved, as at 5, to receive a portion of the rod. Of course, the bracket can be permanently secured to the axle or otherwise connected therewith. A cylindrical part 6 is connected with the upper face of the bracket and is formed with a groove 7.

The brace 8 is of substantially U shape form with its limbs bent inwardly, as at 9, so as to form a loop portion 10 at the closed end of the brace which engages the groove 7. A rectangular frame 11 is placed over the parts 9 of the limbs and this frame carries a set screw 12, the inner end of which engages one of the limbs so that by adjusting this screw, the curved portions 9 can be pressed toward each other or they may be moved away from each other so that the frictional engagement of the part 10 with the walls of the groove in the member 6 can be regulated.

The ends of the limbs of the brace pass through holes 13 formed in a block 14 and this block is rotatably connected with a U-shaped bracket 15 by a bolt 16, the bracket fitting over the connecting rod 17 of the steering mechanism and said bracket is clamped to the rod by the bolt 18.

Thus it will be seen that the brace and its associated parts will act to stiffen the connecting rod and thus prevent shimmying of the front wheels of the vehicle and when the rod is moved during the steering operation, the part 10 of the brace will partly rotate in the groove in member 6 and the block 14 will partly rotate on the bracket 15, with the limbs of the brace sliding in the block. Thus the brace will act to prevent shimmying movement of the front wheels, while not interfering with the movement of the steering mechanism.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:—

1. In combination with a motor vehicle including its front axle and the connecting rod of the steering mechanism, a cylindrical member connected with the front axle, a clamp connected with the connecting rod, a block rotatably supported on the clamp and having a hole therein, a brace having a substantially circular part fitting around the cylindrical member, means for adjusting the frictional engagement of said circular part with the cylindrical member, the rear end of the brace passing through the opening in the block.

2. In combination with a motor vehicle including its front axle and the connecting rod of the steering mechanism, a cylindrical member on the front axle having a groove therein, a bracket on the connecting rod, a block rotatably mounted on the bracket and having a pair of holes therein, a substantially U-shaped brace having a substantially circular bight part for fitting in the groove of the cylindrical member with the ends of its limbs fitting in the holes in the block.

3. In combination with a motor vehicle including its front axle and the connecting rod of the steering mechanism, a cylindrical member on the front axle having a groove therein, a bracket on the connecting rod, a block rotatably mounted on the bracket and having a pair of holes therein, a substantially U-shaped brace having a substantially circular bight part for fitting in the groove of the cylindrical member with the ends of its limbs fitting in the holes in the block and a clamp on the brace adjacent the bight part thereof for adjusting the tension between said bight and the walls of the groove.

In testimony whereof we affix our signatures.

GEORGE F. COLLEY.
THOMAS W. TEDDY.